United States Patent
Nauman

(10) Patent No.: US 11,156,575 B2
(45) Date of Patent: Oct. 26, 2021

(54) SORBENT WITH DETECTION ARRAY

(71) Applicant: Brady Worldwide, Inc., Milwaukee, WI (US)

(72) Inventor: J. Michael Nauman, Little Rock, AR (US)

(73) Assignee: Brady Worldwide, Inc., Milwaukee, WI (US)

( * ) Notice: Subject to any disclaimer, the term of this patent is extended or adjusted under 35 U.S.C. 154(b) by 147 days.

(21) Appl. No.: 16/216,605

(22) Filed: Dec. 11, 2018

(65) Prior Publication Data

US 2020/0182816 A1 Jun. 11, 2020

(51) Int. Cl.
*G01N 27/12* (2006.01)
*G01N 27/04* (2006.01)
*B01J 20/28* (2006.01)
*B01J 20/281* (2006.01)
*E02B 15/06* (2006.01)

(52) U.S. Cl.
CPC .......... *G01N 27/125* (2013.01); *B01J 20/281* (2013.01); *B01J 20/28033* (2013.01); *E02B 15/06* (2013.01); *G01N 27/045* (2013.01); *B01J 2220/49* (2013.01); *B01J 2220/82* (2013.01)

(58) Field of Classification Search
CPC ...... G01N 27/12; G01N 27/125; G01N 27/04; G01N 27/045; B01J 2220/49; B01J 2220/82; E02B 15/06
See application file for complete search history.

(56) References Cited

U.S. PATENT DOCUMENTS

| | | | |
|---|---|---|---|
| 6,126,595 A * | 10/2000 | Amano | A61B 5/18 600/300 |
| 6,399,853 B1 | 6/2002 | Roe et al. | |
| 10,002,317 B1 | 6/2018 | Nauman | |
| 2008/0252447 A1 * | 10/2008 | Atherton | G08B 19/00 340/540 |
| 2010/0030173 A1 | 2/2010 | Song et al. | |
| 2010/0072271 A1 | 3/2010 | Thorstensson | |
| 2013/0303867 A1 | 11/2013 | Elfstrom et al. | |
| 2014/0200538 A1 | 7/2014 | Euliano et al. | |
| 2015/0042489 A1 | 2/2015 | LaVon | |
| 2015/0063911 A1 * | 3/2015 | Nedwed | E02B 15/0814 405/63 |
| 2015/0086270 A1 * | 3/2015 | Shany | E02B 15/06 405/63 |
| 2015/0264452 A1 | 9/2015 | Duesterhoft et al. | |
| 2015/0295562 A1 * | 10/2015 | Agarwal | H03K 3/011 73/23.3 |

(Continued)

OTHER PUBLICATIONS

PCT International Search Report and Written Opinion, PCT/U92019/065198, dated Apr. 8, 2020, 18 pages.

*Primary Examiner* — Son T Le
(74) *Attorney, Agent, or Firm* — Quarles & Brady LLP

(57) ABSTRACT

A sorbent product having a sensor array for detecting a sorbate. The sorbent product includes a sorbent body configured to absorb the sorbate and a sensor array integrated with the sorbent body. The sensor array includes a plurality of sensing elements, an electric power source in electrical communication with the plurality of sensing elements, and a controller configured to detect a change in an electrical property of at least one of the plurality of sensing elements and provide a signal containing information based on the detected change.

21 Claims, 5 Drawing Sheets

(56) References Cited

U.S. PATENT DOCUMENTS

2017/0089853 A1    3/2017  Goenka et al.
2017/0340254 A1    11/2017 Davis et al.
2018/0263539 A1*   9/2018  Javey .................... A61B 5/6833
2018/0333306 A1*   11/2018 Ahong ................... G16H 40/63

* cited by examiner

SORBENT WITH DETECTION ARRAY

CROSS-REFERENCE TO RELATED APPLICATION

Not applicable.

STATEMENT OF FEDERALLY SPONSORED RESEARCH OR DEVELOPMENT

Not applicable.

BACKGROUND

This disclosure generally relates to sorbent products and more particularly to sorbent products comprising sensors to provide information relating to absorbed or adsorbed fluids.

Sorbent products such as mats, wipes, socks and booms are used to clean up unwanted spills of chemicals. They are frequently used in industrial facilities where liquid leaks and spills are common and may be preventatively placed on the floor where a leak or spill is anticipated or to isolate and control an existing spill. For example, sorbent products can be placed around equipment or attached to equipment or pipes. Sorbent products, especially booms, are also useful for cleaning oil or solvent spilled on open water since they can be made to be oleophilic and hydrophobic, and can float on the water without absorbing any water. Apart from the industrial or environmental uses, sorbent products are also applicable for cleaning up more routine spills in facilities like grocery stores, hospitals, and schools.

During use, sorbent products will reach a point of saturation which causes the sorbent material to become non-effective. Accordingly, the user of a sorbent product often must remove the sorbent product from the application or use site in order to ascertain whether the sorbent product has reached its saturation capacity. This process is inconvenient to the user and sometimes causes a delay in replacing the sorbent product even once it has passed its point of saturation. Additionally, this process increases costs associated with the sorbent product including labor costs for removing, checking, and replacing a sorbent product that is less than fully saturated. Still yet, if the sorbent product is discarded prior to achieving full saturation, additional costs are incurred when putting into place new sorbent products prematurely.

SUMMARY

In an attempt to address these issues, some previous sorbent systems have introduced saturation indication systems such as color indication when a particular region is saturated. However, these systems have come with significant drawbacks. In many cases, these systems lack spatial information and only provide information at a single location. By detecting a saturation condition at only one portion of the sorbent product, it can provide false indications of saturation if that portion of the sorbent becomes locally saturated. In addition to failing to provide spatial information to a user, previous systems often fail to provide temporal information as a sorbate spill progresses through a sorbent product. Further yet, many traditional solutions do not provide any information as to the composition of the mixture and often have used complex, expensive sensors.

Hence, there is a need for sorbent products that improve upon previous single-indicator or sensor saturation systems by providing additional spatial, temporal, and/or compositional information to a user to allow for improved monitoring of the progression of a sorbate spill and the status of the sorbent product. Such a sorbent product may be compact, low-cost, and capable of effectively providing useful information in real-time.

Described herein are improved sorbent products for indicating spatial, temporal, and/or compositional information to a user using an array of sensing elements. The use of a plurality of sensing elements provides valuable information to a user, thereby allowing for proper sorbent product disposal and providing more accurate or detailed sorbate alert notifications.

In one aspect, a sorbent product is provided having a sensor array for detecting a sorbate. The sorbent product includes a sorbent body configured to absorb the sorbate and a sensor array integrated with the sorbent body. The sensor array includes a plurality of sensing elements, an electric power source in electrical communication with the plurality of sensing elements, and a controller. The controller is configured to detect a change in an electrical property of at least one of the plurality of sensing elements and provide a signal containing information based on the detected change.

In another aspect, a method is provided for signaling a user when a pre-determined threshold of saturation of a sorbate in the sorbent body has been reached. The method includes the steps of providing a sorbent product of the type described above and/or herein, applying the sorbent product to a site where a sorbate leak is anticipated, observing an indicator, and replacing the sorbent product if the indicator indicates that a pre-determined threshold of saturation of the sorbate in the sorbent body has been reached.

In yet another aspect, a method is provided of making a sorbent product having a sensor array for detecting a sorbate. The method includes the steps of providing a sorbent body configured to absorb the sorbate and integrating a sensor array with the sorbent body. The sensor array includes comprise a plurality of sensing elements, an electric power source in electrical communication with the plurality of sensing elements, and a controller configured to detect a change in an electrical property of at least one of the plurality of sensing elements and provide a signal containing information based on the detected change.

In still another aspect, a method is provided for signaling a user when a pre-determined threshold of saturation of a sorbate in the sorbent body of a sorbent product of the types described above and/or herein. The method includes monitoring the electrical property in at least one of the plurality of sensing elements providing an indicator when a saturation condition of the sorbate in the sorbent body has been met.

In a further aspect, a sorbent product is provided having a sensor array for detecting a sorbate. The sorbent product includes a sorbent body configured to absorb the sorbate and a sensor array integrated with the sorbent body. The sensor array includes a plurality of sensing elements and a transponder in electrical communication with the plurality of sensing elements. The transponder is configured to provide a signal containing information about whether the plurality of sensing elements have come in contact with the sorbate. In some forms, the information provided is quantitative providing the number of sensing elements that have been contacted by the sorbate, the time at which the elements have been contacted, and so forth.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

As used herein, "sorbent body" can refer to any absorbent or adsorbent material capable of adsorbing or absorbing a fluid.

As used herein, "sorbate" can refer to a fluid such as a gas or liquid that is capable of being adsorbed or absorbed.

As used herein, "saturation" or "pre-determined threshold of saturation" can refer to a predetermined relative degree of saturation that is less or equal to the absolute degree of saturation by a sorbate to be absorbed by the sorbent product. For example, the threshold of saturation can be about 10%, 20%, 30%, 40%, 50%, 60%, 70%, 80%, 90% or 100% of the saturation capacity of the sorbent body. Preferably, the threshold of saturation is at least 80%, or more preferably at least 90% of the saturation capacity of the sorbent body.

Figure 1:
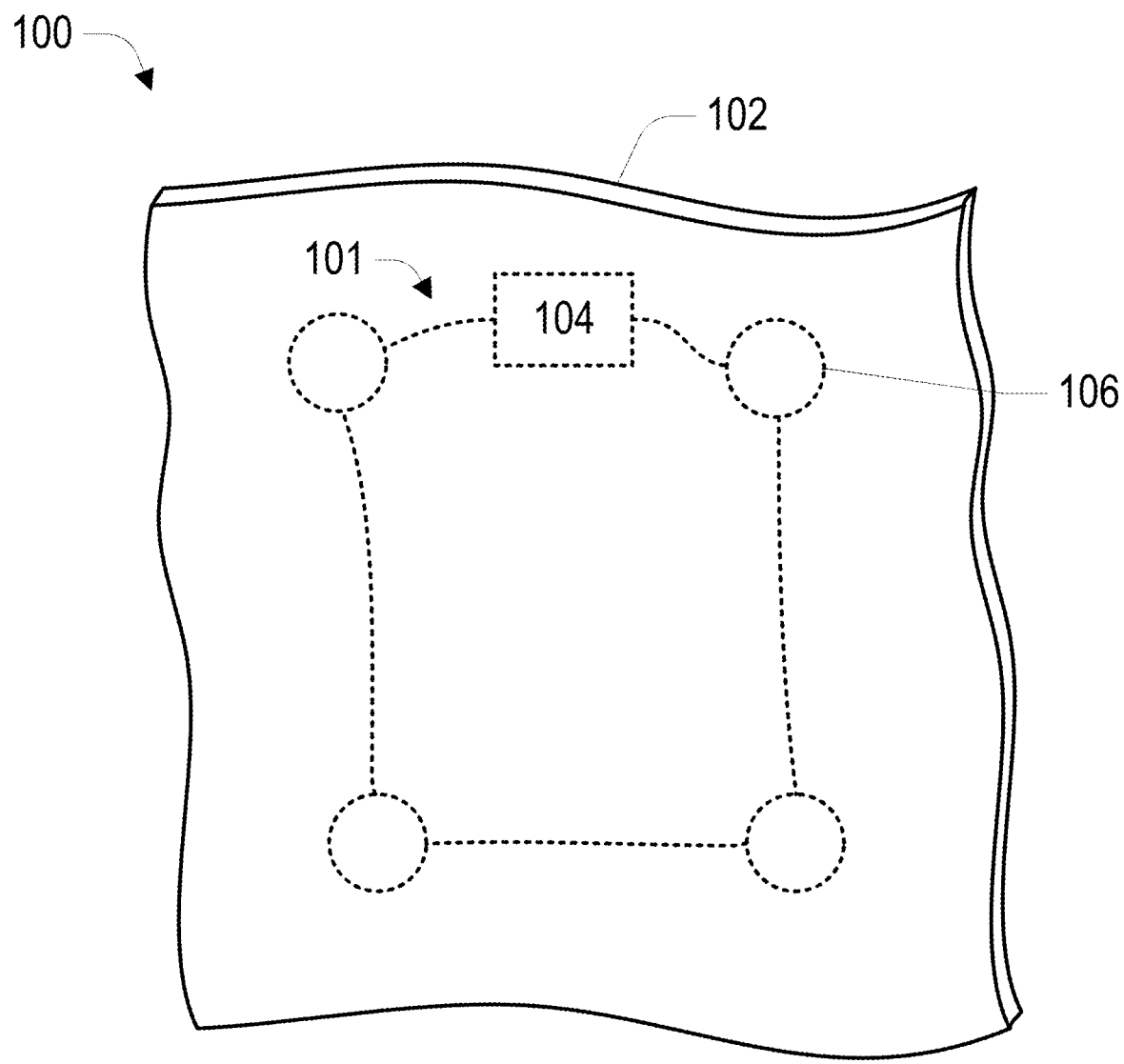
FIG. 1 is a schematic representation of a sorbent product in the form of a mat or wipe. A sensor array is connected in series and is depicted with dashed lines to represent its internal position within the mat or wipe.

Referring first to FIG. 1, a schematic representation of a sorbent product 100 is illustrated in the form of an absorbent sheet. The sorbent product 100 includes a sensor array 101 positioned within sorbent body 102. As will be further described, the sensor array can be used to detect a sorbate. As shown in FIG. 1, the sorbent body 102 is in the form of a planar wipe or mat. The sensor array 101 includes a main unit 104 in electrical communication with four sensing elements 106 which are electrically connected in series. In this illustration, the main unit 104 and the sensing elements 106 have been represented by a box and circles respectfully. The main unit 104 can house sensor array items that are in electric communication with the sensing elements 106. For example, the main unit 104 may house one or more electric power sources in electrical communication with the plurality of sensing elements 106. The main unit 104 can also house one or more controllers configured to detect a change in an electrical property of at least one of the plurality of sensing elements 106 and provide a signal containing information based on the detected change. More generally, a transponder might be present in the main unit 104, which could be an active or passive RFID transponder. Various physical manifestations of the sorbent product 100 are contemplated and will be described in greater detail below.

Although the sensing elements 106 are electrically arranged in series in FIG. 1, the sensing elements 106 may be electrically arranged in alternative configurations to allow for improved detection of a sorbate. For example, the sensing elements may be arranged in various series or parallel configurations. Still further, the main unit 104 may be located at various positions along the electrical configuration.

The sorbent body 102 may take various forms and compositions. For instance, the sorbent body 102 may be selected from a group consisting of mats, wipes, socks, booms, and the mixtures thereof. The sorbent body 102 may comprise specific materials or substances capable of absorbing or adsorbing harmful analytes present within a sorbate to render the analytes inert. The sorbent body may be a melt-blown polypropylene (MBPP) mat made of non-woven polypropylene fibers, which is intended as a sorbent for oil or water-based liquid spills. The sorbent body may be used to clean or contain spills on floors, such as on cement floors. It is contemplated that the sorbent product may also be used to clean oil from water. Depending on the particular application, the sorbent product may be modified to have particular absorbent qualities.

Figure 2:
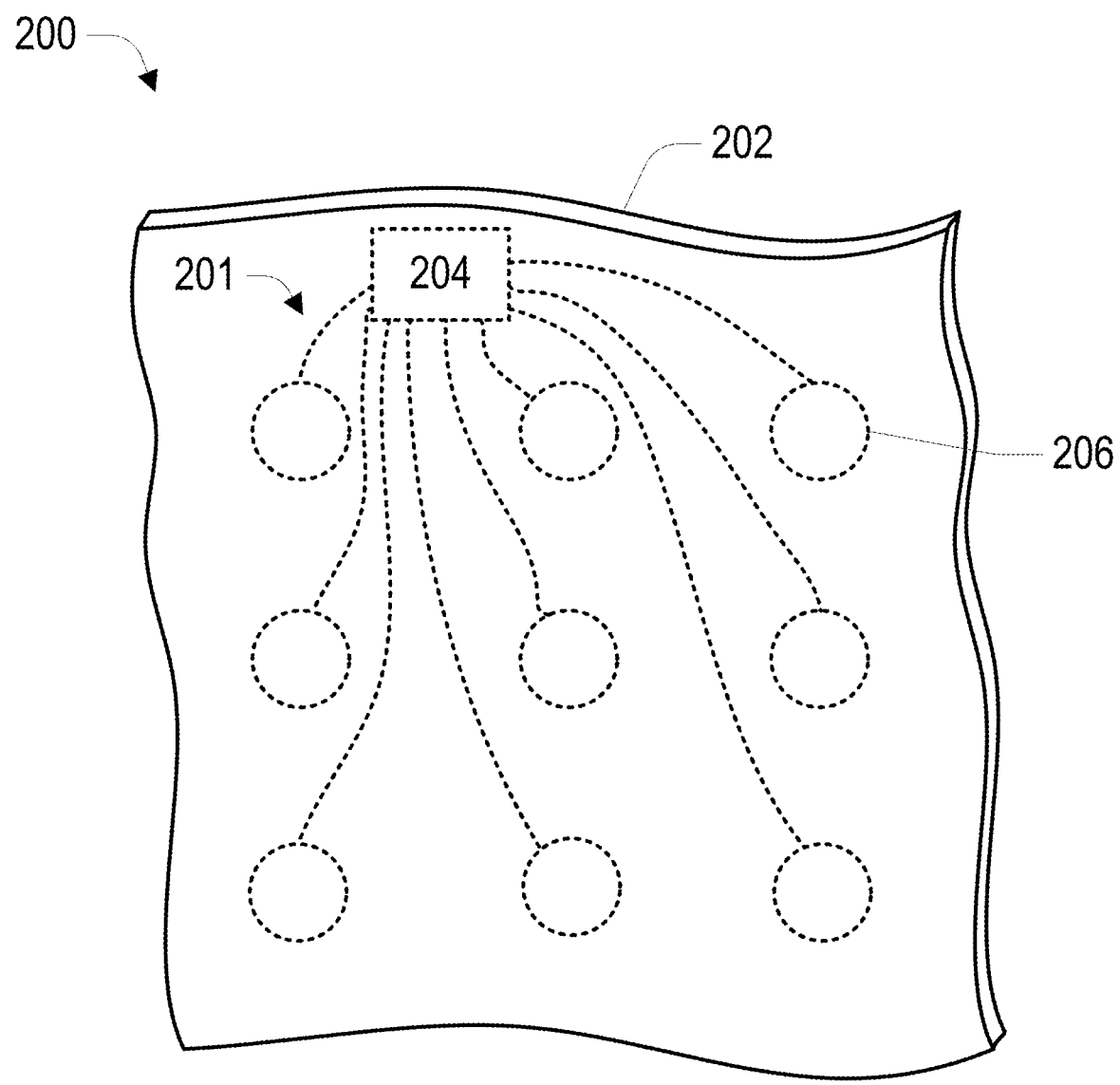
FIG. 2 is a schematic representation of a sorbent product in the form of a mat or wipe. A sensor array is connected individually and is depicted with dashed lines to represent its internal position within the mat or wipe.

FIG. 2 illustrates a schematic representation of another sorbent product 200 in the form of an absorbent sheet. In relatively similar manner to sorbent product 100, the sorbent product 200 has a sensor array 201 positioned within a sorbent body 202, the sensor array 201 comprising a main unit 204 in electrical communication with (in this case) nine sensing elements 206. The sensing elements 206 are again in electrical communication with the main unit 204. In this arrangement and in contrast to the connectivity arrangement in sorbent product 100, the sensing elements 206 are connected individually to the main unit 204 and are not in direct electrical communication with one another.

It is contemplated that the sensing elements (regardless of the particular sorbent product involved) may be integrated with the sorbent body in a variety of different configurations. For instance, the sensing elements may be positioned on the exterior or interior of the sorbent body. The sensing elements may be positioned using patterns or at specific locations with respect to the sorbent body. Some of the sensing elements may be strategically positioned at locations along the sorbent that commonly contact the sorbate either first or last. For instance, in situations where sorbate compositional information is valued, at least a portion of the sensing elements may be located on an exterior face of the sorbent body that is likely to contact the sorbate immediately. Alternatively, in situations where a determination of total saturation of the sorbent body is valued, at least a portion of the sensing elements may be located within the sorbent body at a position that commonly becomes saturated last. Positioning sensing elements at various locations within and on the sorbent body can allow a user to receive a variety of information about the sorbate and the sorbent body using only a single configuration.

Figure 3:
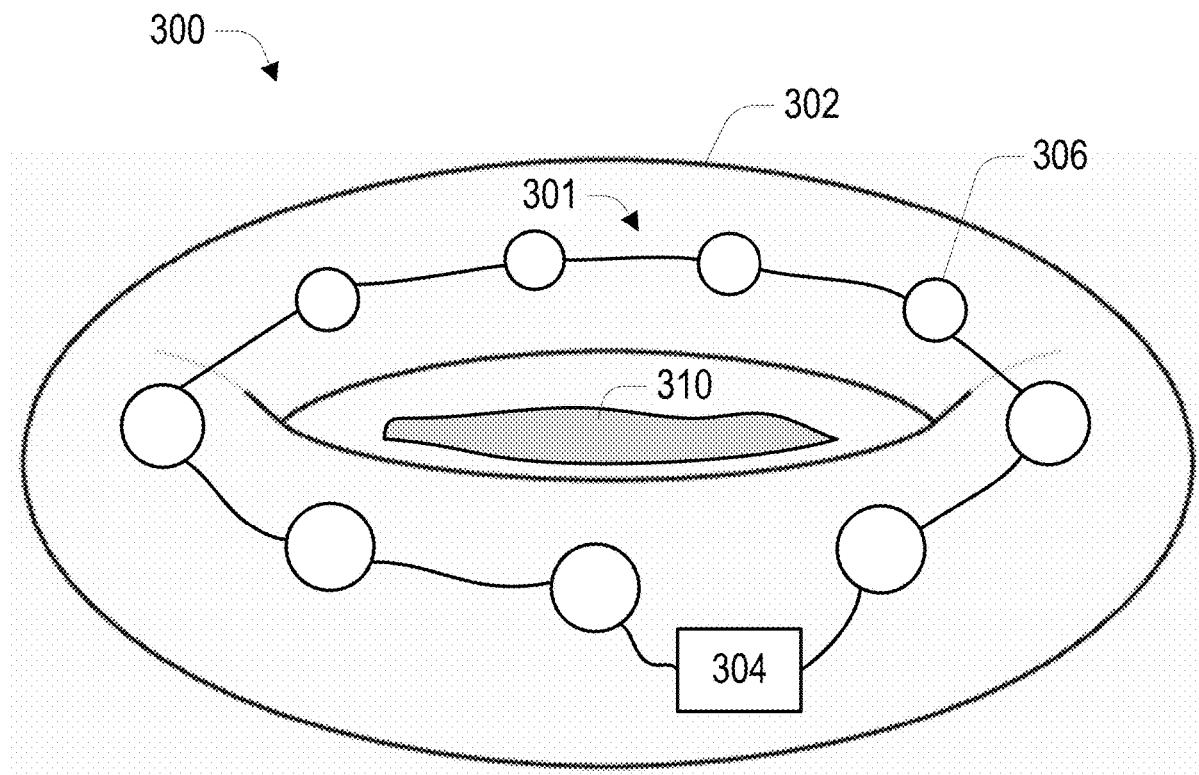
FIG. 3 is a schematic representation of a sorbent product in the form of a sock or boom. The sorbent product surrounds a sorbate spill.

FIG. 3 illustrates a schematic representation of yet another sorbent product 300 in the form of an absorbent sock with external sensors. The sorbent product 300 has a sensor array 301 integrated with a sorbent body 302, the sensor array 301 comprising a main unit 304 in electrical communication with nine sensing elements 306. The sensing elements 306 are in electrical communication with the main unit 304. In this arrangement, the sensing elements 306 are electrically connected in series and located on the exterior of the sorbent body 302. The sorbent body 302 is in the form of a circular sock or boom, which can be placed to surround a sorbate spill 310.

Figure 4:
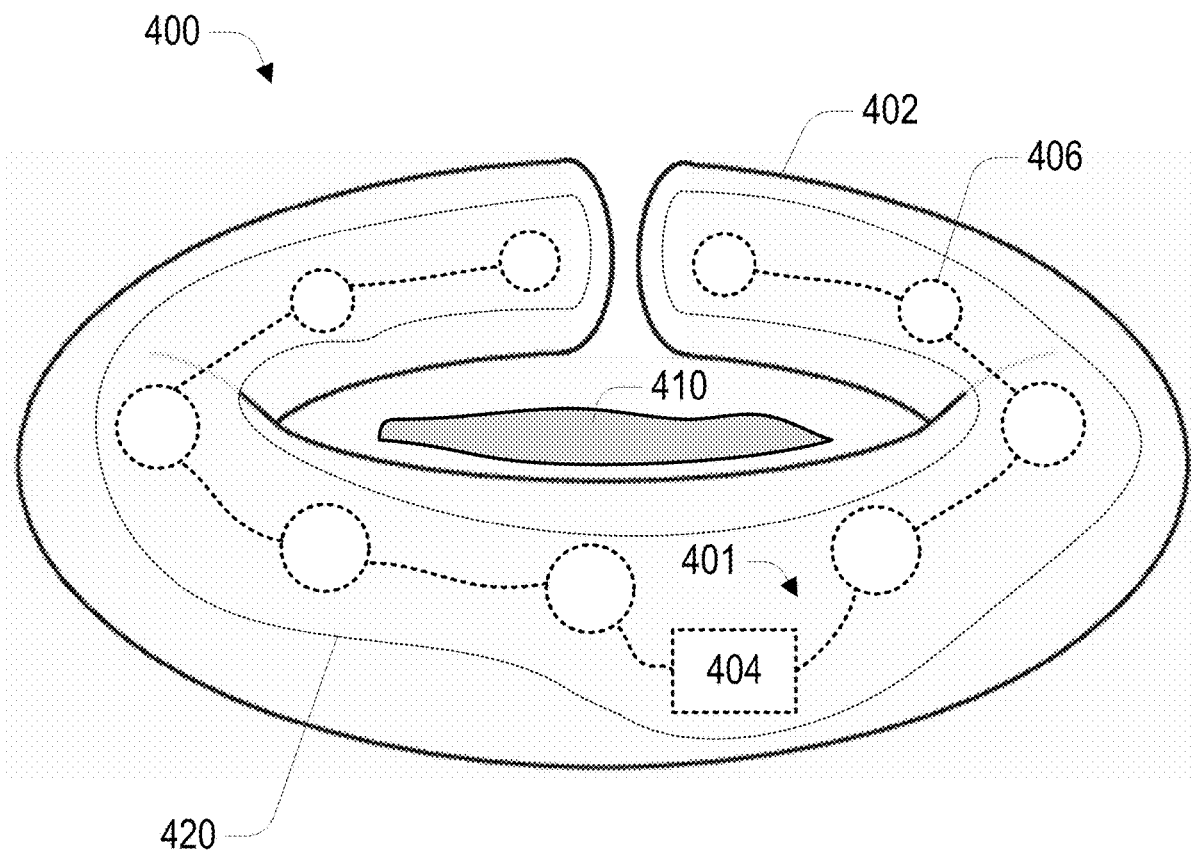
FIG. 4 is a schematic representation of a sorbent product in the form of a sock or boom. A sensor array is connected in series and is depicted with dashed lines to represent its internal position within the sock or boom.

FIG. 4 illustrates another schematic representation of a sorbent product 400 in the form of an absorbent sock with internal sensors. Similar to the previous configurations, the sorbent product 400 has a sensor array 401 positioned within a sorbent body 402, the sensor array 401 comprising a main unit 404 in electrical communication with nine sensing elements 406. The sensing elements 406 are in electrical communication with the main unit 404. In this arrangement, the sensing elements 406 are electrically connected in two separate series circuits. The sensing elements 406 are positioned within a sensor container 420. The sensor container 420 may be formed of a material chosen to have different material properties than the sorbent body. Again, the sorbent body 402 is in the form of a sock or boom, which can be positioned to surround a sorbate spill 410.

In one aspect, a method is provided for signaling a user when a pre-determined threshold of saturation of a sorbate in the sorbent body has been reached. The method can comprise the steps of providing the sorbent product, applying the sorbent product to a site where a sorbate leak is anticipated, observing an indicator, and replacing the sorbent product if the indicator indicates the pre-determined threshold of saturation of the sorbate in the sorbent body has been reached. In another form, rather than a saturation indication, the indicator can provide an indication of an alternative state of the sorbent product. For instance, the method may involve replacing the sorbent product if the indicator indicates that a hazardous analyte has contacted the sorbent product.

As illustrated by FIGS. 3 and 4, the sorbent product may be positioned to surround and contain a sorbate spill. In some instances, the sorbate spill may be a contained slow leak, continuously evaporating spill. These slow leak spills often occur from machinery leaks that are not considered an immediate problem. For such spills, the sorbent product may be generally used to surround the spill and provide immediate information if the spill expands beyond a typical size, thereby providing an immediate alert of a change in state of the machinery. Having a plurality of sensing elements as opposed to a single-sensor sensor allows for such a change in a slow leak spill to be identified much sooner on average. Similarly, the sorbent product may be positioned in a location that leak or spill is anticipated in order to quickly provide an alert if a leak does occur.

Figure 5:
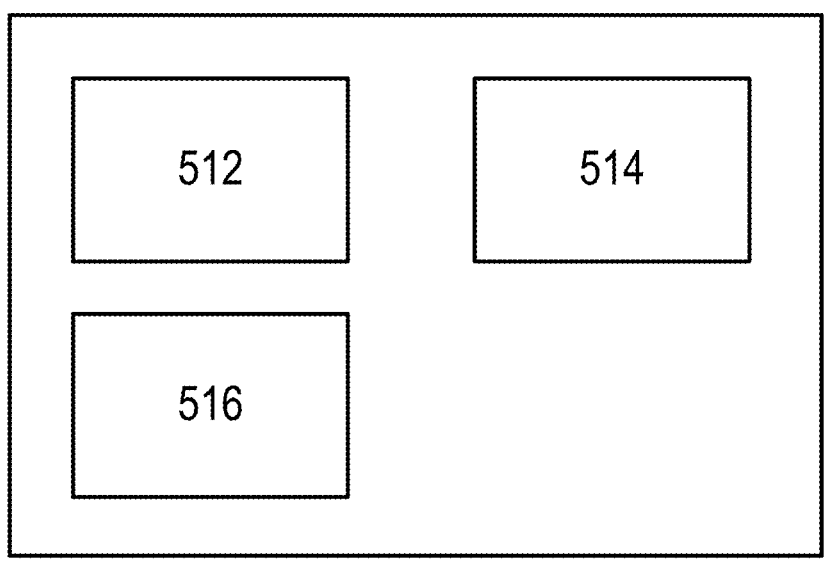
FIG. 5 is a schematic representation of a main unit of a sorbent product. In this illustration, the main unit comprises an electric power source, a controller, and an indicator.

FIG. 5 illustrates a schematic representation of an exemplary main unit 504 comprising an electric power source 512, a controller 514 configured to detect a change in an electrical property of at least one of the plurality of sensing elements and provide a signal containing information based on the detected change, and an indicator 516 configured to receive the signal and provide the information to a user. The main unit 504, electric power source 512, controller 514, and indicator 516 have been represented by boxes. One of skill in the art will readily recognize that there are many different forms and configurations that the components of the main unit 504 can take in order to achieve their intended functionality.

Still yet, as previously mentioned, it is contemplated that some of these elements may be combined differently or not present in the main unit. For example, it is contemplated that the main unit could be a transponder such as an RFID transponder in which, the battery or controller might be eliminated altogether in favor of a passive circuit that response only upon reception of a polling request.

The sensing elements of the sorbent product may be configured to undergo a change in an electrical property when a sorbate is present. For instance, the electrical resistivity and conductivity of an active component of the sensing element may change based on the presence of a sorbate. The change in the electrical property may open, close, or otherwise alter the properties of circuit to which the sensing element is integrated with. Factors such as the temperature of the sorbent body, the atmospheric pressure, and the phase, amount, and/or composition of the sorbate may affect the change in the electrical property. The sensing elements may be specifically tailored and functionalized to adsorb specific analytes. Consequently, the sensing elements may be used to detect temperature changes, liquid detection, the presence of specific analytes, as well as other stimuli.

The sensing elements can include active components comprising materials as a metal, an organic material, a dielectric material, a semiconductor material, a polymeric material, a biological material, a nanowire, a semiconducting nanoparticle, a carbon nanotube, a nanofiber, a carbon fiber, a carbon particle, or combination thereof. The plurality of sensing elements may comprise an active component having a material selected from the group consisting of graphene, graphene derivatives, and carbon nanotubes.

In one form, the sensing elements comprise an active component that is formed from graphene. Graphene may be reactive in the presence of other chemical species and the binding of graphene to these chemical species (even in small amounts) may alter the electrical resistance or other properties of the graphene segment. For example, U.S. Pat. No. 10,002,317, the contents of which are incorporated herein by reference in its entirety, describes graphene sensors that may individually function as a single sensing element in the sensing array of the present disclosure.

The electric power source may be an electrochemical cell such as a lithium ion battery. Alternatively, the electric power source may be an AC/DC external plug-in power supply. In order to determine a change in an electrical property of at least one of the sensing elements, an electric current may be applied to each of the sensing elements. The electric power source may configured to continuously apply such a current. Alternatively, the electric power source may repeatedly provide an electrical pulse of the current after a time interval. The time interval may be selected from the group consisting of between 0.1 hour and 1 hour, between 1 hour and 10 hours, between 10 hours and 24 hours, and between 24 hours and 168 hours.

When a controller is present, it is contemplated that the controller of the sensor array may be configured to detect a change in an electrical property of at least one of the plurality of sensing elements and provide a signal containing information based on the detected change. The controller may analyze a voltage or current change within a circuit of the sensing elements.

The signal may contain information on the composition of the sorbate, the progression of a sorbate spill, the saturation of the sorbent body, combinations thereof, or additional information. The information on the composition of the sorbate may include the identification of a hazardous analyte within the sorbate. The controller may provide spatial or temporal information on the state of the sorbent body and therefore detect these various values and states even at unique sensors in some instance. For instance, the controller may provide information relating to the saturation progression over time in a specific region of the sorbent body based on the observed change from the sensing element(s) within that region.

It will be appreciated that the controller can be programmed to provide the functionality described herein. Thus, one having ordinary skill in the art will appreciate that, any description of a particular recited functionality described herein (e.g., action and/or response) may be achieved by programming the controller, given that the controller is in communication with the various component parts of the sorbent product. Thus, any description of recited functionality should be taken to mean that the controller may be programmed to operate in the way recited to achieve the recited result.

Further, the signal that the controller provides may be sent to an indicator. The indicator may be configured to receive the signal from the controller and produce an alert indication. The indicator may process the signal from the controller in order to determine which alert signal should be provided, if any. The indicator may comprise an audio device and the alert signal may be provided to a user in the form or a soundwave. For instance, the indicator may play a prerecorded message such as "REPLACE" or "HAZARD". Alternatively, the indicator may comprise a display configured to produce a visual alert signal or alert term. Such a display may be selected from the group comprising a color-changing ink display, a liquid-crystal display, and an electronic paper display; of course, other indicators may be used including even very basic indicators, such as the illumination of an LED light.

The indicator may be located within the main unit of the sensor array. Alternatively, the indicator may be located on an external surface of the sorbent body. Still yet, in some forms, the sorbent body and sensor array may not comprise an indicator and instead contain a transmitter configured to transmit the signal to an indicator located at a distance. In these forms, the sensor array may comprise a transmitter, such as radio-frequency identification tag. The transmitter may be configured to provide the signal to the remote indicator. Again, as mentioned above, it is contemplated some of the logic associated with the detection criterion may also be found outside of the sorbent product and so it is contemplated that a transponder might be coupled to the circuit and a separate component may contain the logic conditions under which an indication is produced.

The present disclosure also provides a method of making a sorbent product having a sensor array for detecting a sorbate. The method can comprise providing a sorbent body configured to absorb the sorbate, and integrating a sensor array with the sorbent body, wherein the sensor array can comprise a plurality of sensing elements, an electric power source in electrical communication with the plurality of sensing elements, and a controller configured to detect a change in an electrical property of at least one of the plurality of sensing elements and provide a signal containing information based on the detected change. The step of integrating the sensor array may comprise an insertion of the sensor array and connecting the sensor array to the sorbent body.

In general, one of skill in the art will recognize that the sensor array and main unit can comprise any number of electronic components such as resistors, transistors, capacitors, inductors and diodes, processors, conductive wires or traces through which electric current can flow, and additional electronic components in order to achieve the described functionality.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A sorbent product having a sensor array for detecting a sorbate, the sorbent product comprising:
    a sorbent body configured to absorb the sorbate;
    a sensor array integrated with the sorbent body, the sensor array comprising:
        a plurality of sensing elements;
        an electric power source in electrical communication with the plurality of sensing elements; and
        a controller configured to detect a change in an electrical property of at least one of the plurality of sensing elements and to provide a signal containing information based on the detected change; and
    an indicator in contact with the sorbent body, the indicator configured to receive the signal from the controller and indicate to an observer when a pre-determined threshold of saturation of the sorbate in the sorbent body has been reached;
    wherein the sorbent body is a sock or boom and is configured to surround a sorbate spill on a horizontal surface;
    wherein the pre-determined threshold of saturation corresponds to a full saturation condition at which point the sorbent product becomes non-effective for further absorption of the sorbate.

2. The sorbent product of claim 1, wherein the electrical property is electrical resistivity.

3. The sorbent product of claim 1, wherein the plurality of sensing elements comprise a material selected from the group consisting of graphene, graphene derivatives, and carbon nanotubes.

4. The sorbent product of claim 1, wherein the signal contains information on the composition of the sorbate.

5. The sorbent product of claim 4, wherein the information on the composition of the sorbate includes the identification of a hazardous analyte within the sorbate.

6. The sorbent product of claim 1, wherein the signal contains spatial information on the saturation of the sorbent product by the sorbate.

7. The sorbent product of claim 1, wherein the signal contains spatial information on the quantity or motion of the sorbate over time.

8. The sorbent product of claim 1, wherein the indicator comprises a display configured to produce a visual alert signal or alert term.

9. The sorbent product of claim 8, wherein the display is selected from the group consisting of a color-changing ink display, a liquid-crystal display, and an electronic paper display.

10. The sorbent product of claim 1, wherein the indicator comprises an audio device configured to produce a sound.

11. The sorbent product of claim 1, wherein the sensor array comprises a radio-frequency identification tag that provides the signal to the indicator.

12. The sorbent product of claim 1, wherein the plurality of sensing elements are arranged in at least one series circuit.

13. The sorbent product of claim 1, wherein the plurality of sensing elements are arranged in at least one parallel circuit.

14. The sorbent product of claim 1, wherein the electrical power source is configured to repeatedly provide an electrical pulse after a time interval.

15. The sorbent product of claim 14, wherein the time interval is selected from the group consisting of between 0.1 hour and 1 hour, between 1 hour and 10 hours, between 10 hours and 24 hours, and between 24 hours and 168 hours.

16. The sorbent product of claim 1, wherein the electrical power source is an electrochemical cell.

17. A method of using the sorbent product of claim 1 and signaling a user when the pre-determined threshold of saturation of the sorbate in the sorbent body has been reached, comprising the steps of:
- applying the sorbent product to a site where a sorbate leak is anticipated;
- observing the indicator; and
- replacing the sorbent product if the indicator indicates that a pre-determined threshold of saturation of the sorbate in the sorbent body has been reached.

18. A method for signaling a user when a pre-determined threshold of saturation of a sorbate in the sorbent body of a sorbent product of claim 1 has been reached, comprising the steps of:
- monitoring the electrical property in at least one of the plurality of sensing elements; and
- indicating when the pre-determined threshold of saturation of the sorbate in the sorbent body has been reached.

19. The method of claim 18 wherein the pre-determined threshold of saturation includes detecting the sorbate at all of the plurality of sensing elements.

20. The method of claim 18 further comprising the step of providing a signal containing quantitative information based on the detected change.

21. A method of making a sorbent product having a sensor array for detecting a sorbate, the method comprising:
- providing a sorbent body configured to absorb the sorbate;
- integrating a sensor array with the sorbent body, the sensor array comprising:
  - a plurality of sensing elements;
  - an electric power source in electrical communication with the plurality of sensing elements; and
  - a controller configured to detect a change in an electrical property of at least one of the plurality of sensing elements and provide a signal containing information based on the detected change; and
- integrating an indicator with the sorbent body, the indicator configured to receive the signal from the controller and indicate to an observer when a pre-determined threshold of saturation of the sorbate in the sorbent body has been reached;
- wherein the sorbent body is a sock or boom and is configured to surround a sorbate spill on a horizontal surface;
- wherein the pre-determined threshold of saturation corresponds to a full saturation condition at which point the sorbent product becomes non-effective for further absorption of the sorbate.

\* \* \* \* \*